(12) United States Patent
Kato

(10) Patent No.: US 8,657,355 B2
(45) Date of Patent: Feb. 25, 2014

(54) PROTECTIVE STRUCTURE FOR HIGH-VOLTAGE UNIT

(75) Inventor: Keisuke Kato, Shizuoka-Ken (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 0 days.

(21) Appl. No.: 13/697,752

(22) PCT Filed: May 16, 2011

(86) PCT No.: PCT/JP2011/061230
§ 371 (c)(1),
(2), (4) Date: Nov. 13, 2012

(87) PCT Pub. No.: WO2011/145577
PCT Pub. Date: Nov. 24, 2011

(65) Prior Publication Data
US 2013/0057028 A1 Mar. 7, 2013

(30) Foreign Application Priority Data
May 18, 2010 (JP) ................................. 2010-113957

(51) Int. Cl.
*B60R 11/06* (2006.01)
(52) U.S. Cl.
USPC ........................................................ 296/37.1
(58) Field of Classification Search
USPC ............... 296/37.1, 193.09; 322/4; 180/65.1, 180/65.22, 65.31; 342/357.32; 307/10.1; 105/3
See application file for complete search history.

(56) References Cited

U.S. PATENT DOCUMENTS

| | | | | |
|---|---|---|---|---|
| 5,807,129 A | * | 9/1998 | Konda et al. | 439/348 |
| 5,828,192 A | * | 10/1998 | Kawaguchi et al. | 318/139 |
| 6,356,180 B1 | * | 3/2002 | Masuda et al. | 336/198 |
| 6,930,491 B2 | * | 8/2005 | Gregory et al. | 324/536 |
| 7,154,279 B2 | * | 12/2006 | Gregory et al. | 324/536 |
| 7,713,097 B2 | * | 5/2010 | Eichhorst | 439/721 |
| 7,786,386 B2 | * | 8/2010 | Tarchinski | 174/125.1 |
| 7,893,354 B2 | * | 2/2011 | Albert et al. | 174/72 A |
| 7,898,116 B2 | * | 3/2011 | Hattori et al. | 307/151 |
| 8,012,620 B2 | * | 9/2011 | Takasaki et al. | 429/100 |
| 8,207,698 B2 | * | 6/2012 | Xiang | 318/716 |
| 8,239,128 B2 | * | 8/2012 | Everett et al. | 701/301 |
| 8,249,762 B1 | * | 8/2012 | Flotte et al. | 701/9 |

(Continued)

FOREIGN PATENT DOCUMENTS

| | | |
|---|---|---|
| JP | 2005262894 A | 9/2005 |
| JP | 2006199051 A | 8/2006 |
| JP | 2007223461 A | 9/2007 |
| JP | 2011068187 A | 4/2011 |

OTHER PUBLICATIONS

Search Report for International Patent Application No. PCT/JP2011/061230; Jun. 14, 2011.
English Translation of International Preliminary Report on Patentability, PCT/JP2011/061230 filed May 16, 2011.

*Primary Examiner* — Kiran B Patel
(74) *Attorney, Agent, or Firm* — Barnes & Thornburg LLP

(57) ABSTRACT

A protection structure for a high-voltage unit installed in a vehicle provided with: a vehicle interior; a storage chamber located in front of the vehicle interior in the front-rear direction of the vehicle and storing the high-voltage unit; a dash panel for separating the vehicle interior and the storage chamber; and a high-voltage cable connected to the high-voltage unit.

3 Claims, 5 Drawing Sheets

(56) References Cited

U.S. PATENT DOCUMENTS

| | | | |
|---|---|---|---|
| 8,253,021 B2 * | 8/2012 | Adachi et al. | 174/72 A |
| 8,276,697 B2 * | 10/2012 | Takasaki | 180/68.5 |
| 8,381,850 B2 * | 2/2013 | Asai et al. | 180/65.22 |
| 8,393,426 B2 * | 3/2013 | Takahashi et al. | 180/68.5 |
| 8,422,222 B2 * | 4/2013 | Noda | 361/689 |

* cited by examiner

PROTECTIVE STRUCTURE FOR HIGH-VOLTAGE UNIT

PRIORITY CLAIM

This patent application is a U.S. National Phase of International Patent Application No. PCT/JP2011/061230, filed 16 May 2011, which claims priority to Japanese Patent Application No. 2010-113957, filed 18 May 2010, the disclosures of which are incorporated herein by reference in their entirety.

TECHNICAL FIELD

The present invention relates to a high-voltage unit in a vehicle such as an electric vehicle or a hybrid vehicle, and more particularly, to a protective structure for a high-voltage unit in which high-voltage cables are routed.

BACKGROUND ART

Recently, among electric vehicles (EV), hybrid vehicles (HEV), and the like, much attention has been paid on environmentally friendly vehicles. Such an environment-responsive vehicle is equipped with a motor adapted to drive the vehicle as well as with a high-voltage unit.

As shown in FIG. 6, a vehicle 101 such as an electric vehicle (EV) or a hybrid vehicle (HEV), has a cabin 104 (a room for a driver or a driver and passengers), a storage compartment 105 located in front of the cabin 104 in a forward/backward (longitudinal) longitudinal of the vehicle and adapted to store a high-voltage unit 107 composed of an inverter, motor, and the like, a dash panel 106 configured to partition the cabin 104 and the storage compartment 105 so as to extend in a width direction of the vehicle, and high-voltage cables 109 connected to the high-voltage unit 107 so as to extend rearward in the vehicle.

In such arrangement as mentioned above, the high-voltage cables 109 are made up of a positive-side (+) cable 111 and a negative-side (−) cable 112, connected to a connecting portion 110 on a rear surface portion of the high-voltage unit 107, routed nearly at right angles by extending from the high-voltage unit 107 to the dash panel 106, and covered with a protective member (protector) 116 between the high-voltage unit 107 and the dash panel 106.

PRIOR ART DOCUMENT

Patent Document

Patent Document 1: Japanese Patent Laid-Open Publication No. 2007-223461

An electrical equipment mounting structure and an electric-powered vehicle disclosed in the Patent Document 1 is configured such that, in a storage compartment of a hybrid vehicle, a cable is connected to a connecting portion located on a surface of a control unit which faces an air cleaner.

DISCLOSURE OF THE INVENTION

Problems to be Solved by the Invention

However, conventionally, as shown in FIG. 7, since the high-voltage cables 109 are routed from the dash panel 106 nearly at right angles, it becomes impossible to provide a sufficient extra length, and accordingly, if a vehicle body 102 contracts in contracting portions 102R and 102L due to an external force acting from in front of the vehicle (indicated by hollow arrow P in FIG. 7), the high-voltage cables 109 cannot follow movement (indicated by hollow arrow Q in FIG. 7) of the high-voltage unit 107, which provided fear of breakage of the high-voltage cables 109.

Furthermore, as shown in FIG. 8, an interval from the high-voltage unit 107 to the protective member (protector) 116 is short, which makes it difficult to create a difference between length L1 of the positive-side (+) cable 111 and length L2 of the negative-side (−) cable 112 of the high-voltage cables 109, thus providing a fear of erroneous assembling.

Moreover, as shown in FIG. 9, since the connecting portion 110 for the high-voltage cables 109 is located behind the high-voltage unit 107 relative to a direction of the vehicle, if an external force acts from in front of the vehicle (indicated by hollow arrow P in FIG. 7), there causes a fear such that the positive-side (+) cable 111 and the negative-side (−) cable 112 may touch the vehicle body 102 simultaneously, resulting in a short circuit.

Thus, in view of the conventional technique described above, an object of the present invention is to provide a protective structure for a high-voltage unit in a vehicle capable of preventing erroneous assembling of components, preventing breakage of high-voltage cables and short circuits even in a case where an external force acts the vehicle from the forward side thereof.

Means for Solving the Problems

A vehicle provided with a protective structure for a high-voltage unit according to a preferred embodiment of the present invention is provided with a cabin, a storage compartment to store the high-voltage unit located ahead of the cabin in a longitudinal (forward/backward) direction of the vehicle, a dash panel to partition the cabin and the storage compartment, and a high-voltage unit provided with a high-voltage cable connected to the high-voltage unit, wherein the high-voltage cable is routed from a rear part on a side of the cabin in the longitudinal direction of the vehicle toward a side surface of the vehicle along a wall surface of the dash panel on a side of the storage compartment, deformed (bent) into a U-shape in a space between the dash panel and the high-voltage unit on the way to the high-voltage unit, connected to a side surface of the high-voltage unit, and shaped such that that a part of the high-voltage cable which is routed along the wall surface of the dash panel on the side of the storage compartment and a part connected to the high-voltage unit are substantially parallel to each other.

It may be preferred that the high-voltage unit is an inverter.

It is further effective that the high-voltage unit provided with the protective structure may be applied to vehicles such as electric vehicles or hybrid vehicles.

Effects of the Invention

In a vehicle provided with a protective structure for a high-voltage unit according to the present invention, a connecting portion for the high-voltage cable is placed on the side surface of the high-voltage unit, and the high-voltage cable is formed into a U-shape between the high-voltage unit and the dash panel. Therefore, the high-voltage cables can be prevented from erroneously assembling, as well as the breakage of the high-voltage cable and short circuits thereof can be also prevented from causing even if external force acts from the forward side of the vehicle.

BEST MODE FOR CARRYING OUT THE INVENTION

In order to achieve purposes of preventing short circuits of high-voltage cables as well as preventing breakage of the high-voltage cables and short circuits even if external force acts on a vehicle from a forward direction thereof, the present invention provides a protective structure for a high-voltage unit capable of allowing a connecting portion for the high-voltage cables to be placed on a side surface of the high-voltage unit and enabling the high-voltage cables to be structured into a U-shape between the high-voltage unit and the dash panel.

[Embodiment]

FIGS. 1 to 5 represent one embodiment of the present invention.

Incidentally, in the following description, terms "front/rear" (forward/backward), "right/left," and the like are used assuming that a traveling direction of a vehicle 1 corresponds to a forward direction.

Figure 1:
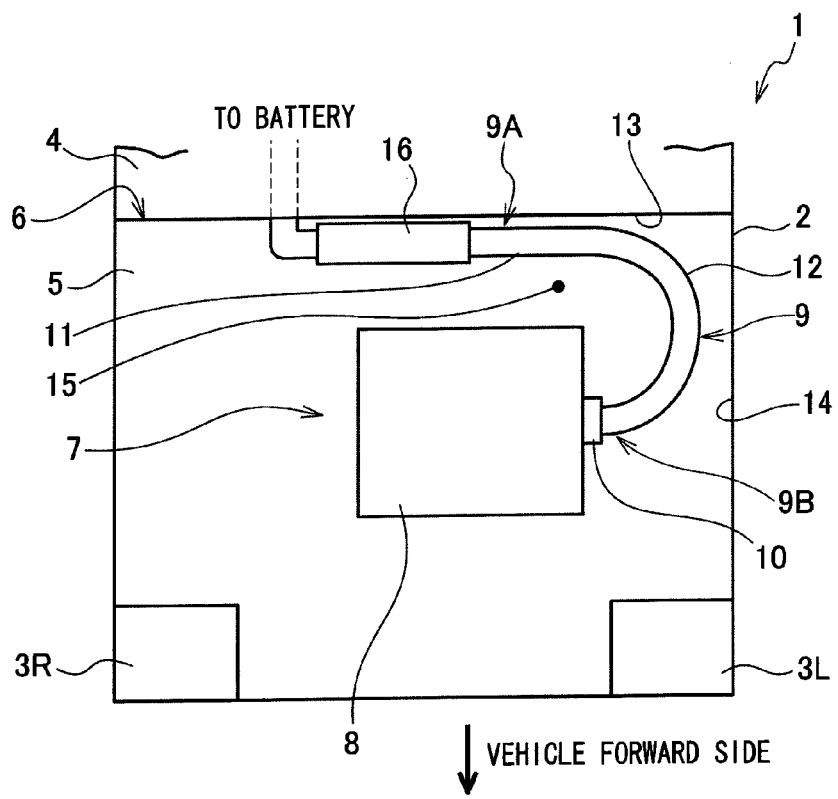
FIG. 1 is a schematic plan view of a front part of a vehicle carrying a high-voltage unit equipped with a protective structure according to an embodiment of the present invention.
Figure 2:
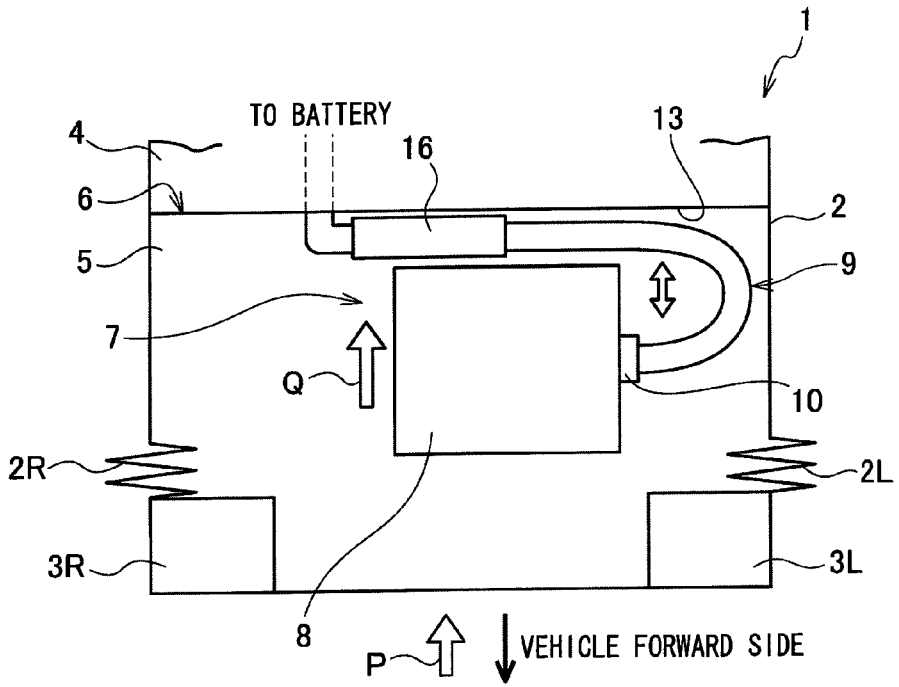
FIG. 2 is a schematic plan view of the front part of the vehicle when an external force acts on the vehicle from a forward side thereof in FIG. 1.

In FIG. 1, the vehicle 1, which is a vehicle such as an electric vehicle (EV) or a hybrid vehicle (HEV), includes a vehicle body (body) 2, a right head light 3R, and a left head light 3L.

The vehicle 1 includes a cabin 4, a storage compartment 5 located ahead of the cabin 4 relative to a direction of the vehicle, and a dash panel 6 is located so as to extend in a vehicle width direction to thereby partition the cabin 4 and the storage compartment 5 from each other.

An inverter 8 rectangular in shape is stored as a high-voltage unit 7 in an approximate center portion of the storage compartment 5. Further, another electrical equipment such as a motor may be provided as the high-voltage unit 7. In a case where the vehicle is a hybrid vehicle (HEV), an engine is normally mounted and stored in the storage compartment 5.

The inverter 8 has a connecting portion 10 for high-voltage cables 9 on a left side surface (right side in FIG. 1). The high-voltage cables 9 are composed of a positive-side (+) cable 11 and a negative-side (−) cable 12, routed from rear part on a side of the cabin in a forward/backward (i.e. longitudinal or running direction) of the vehicle toward the vehicle's left side surface 14 which is a side surface of the vehicle along a wall surface 13 of the dash panel 6 on a side of the storage compartment, deformed (bent) into a U-shape in a space 15 between the dash panel 6 and the inverter 8 on the way to the inverter 8, and connected to the connecting portion 10 on the left side surface of the inverter 8 and to a battery installed on the side of the cabin in the rear part of the vehicle. In such structure, the positive-side (+) cable 11 is routed on an inner side of the negative-side (−) cable 12.

Further, as shown in FIGS. 1 to 5, the high-voltage cables 9 are shaped such that a part 9A routed along the wall surface 13 of the dash panel 6 on the side of the storage compartment and a part 9B connected to the inverter 8 are substantially parallel to each other.

The part 9A of the high-voltage cables 9 which is routed along the wall surface 13 of the dash panel 6 on the side of the storage compartment is covered with a protective member (protector) 16. The protective member 16 serves as a fixed point of the high-voltage cables 9.

Figure 3:
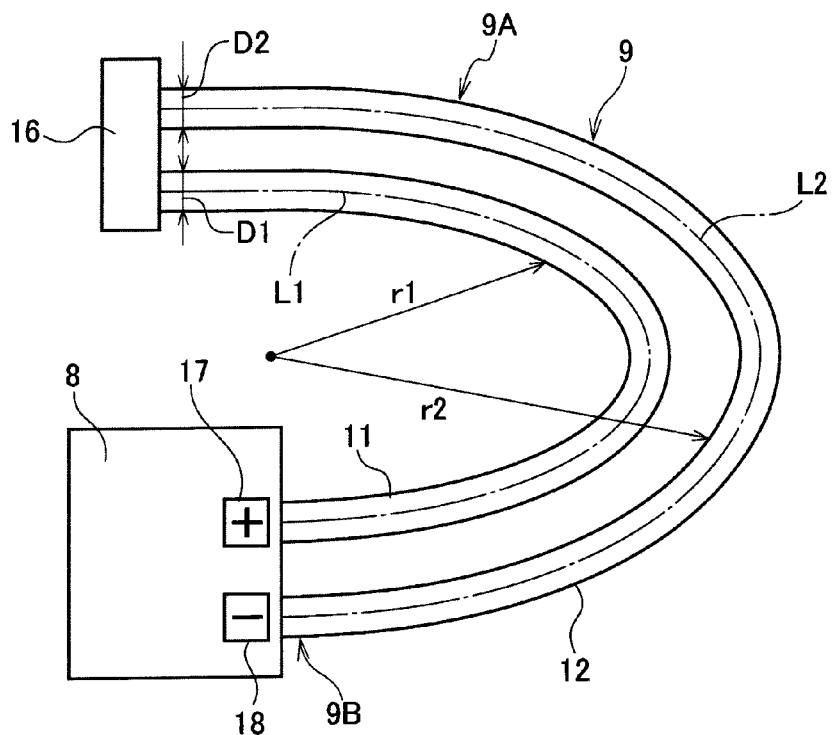
FIG. 3 is an explanatory diagram showing a curved state of high-voltage cables of the high-voltage unit shown in FIG. 1.

Regarding the U-shape of the high-voltage cables 9, as shown in FIG. 3, the high-voltage cables 9 (positive-side (+) cable 11 and negative-side (−) cable 12), which have large wire diameters (D1 and D2), do not readily bent themselves, but have large bends and have a large difference between a bend r1 of the inner positive-side (+) cable 11 and bend r2 of the outer negative-side (−) cable 12.

In this case, length L1 of the positive-side (+) cable 11 and length L2 of the negative-side (−) cable 12 correspond to circumferences πr of semicircles due to the U-shape routing of the high-voltage cables 9, creating a large difference between the bend r1 of the positive-side (+) cable 11 and bend r2 of the negative-side (−) cable 12, and thus inevitably a difference L1<L2 appears prominently. Therefore, by laying out the high-voltage cables 9 connected to the connecting portion 10 of the inverter 8 in a U-shaped pattern, it is possible to vary the length L1 of the positive-side (+) cable 11 and length L2 of the negative-side (−) cable 12 from each other.

As a result, a larger extra length can be provided to the high-voltage cables 9 than that in a conventional arrangement, creating a difference between the length L1 of the positive-side (+) cable 11 and length L2 of the negative-side (−) cable 12 of the high-voltage cables 9, thereby making it possible to prevent the cables from being erroneous assembled when the high-voltage cables 9 are connected to the inverter 8.

Figure 4:
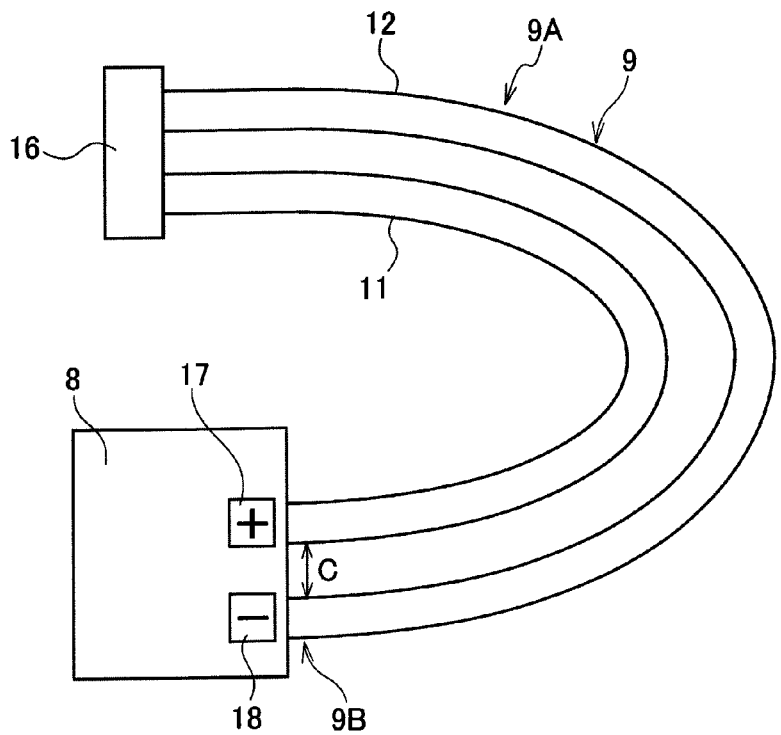
FIG. 4 is an explanatory diagram showing how the high-voltage cables are routed.

Furthermore, as shown in FIG. 4, since the high-voltage cables 9 have leeway in length, the length of the high-voltage cables 9 from the protective member 16 serving as a fixed point to the inverter 8 can be increased. Therefore, when an external force acts from the front side of the vehicle (indicated by hollow arrow P in FIG. 2), there causes contracting portions 2R and 2L in the vehicle body 2, and hence, the inverter 8 moves rearward in the vehicle (indicated by hollow arrow Q in FIG. 2). Even in such case, the high-voltage cables 9 can move easily by following the movement of the inverter 8, making it possible to prevent breakage of the high-voltage cable 9.

Figure 5:
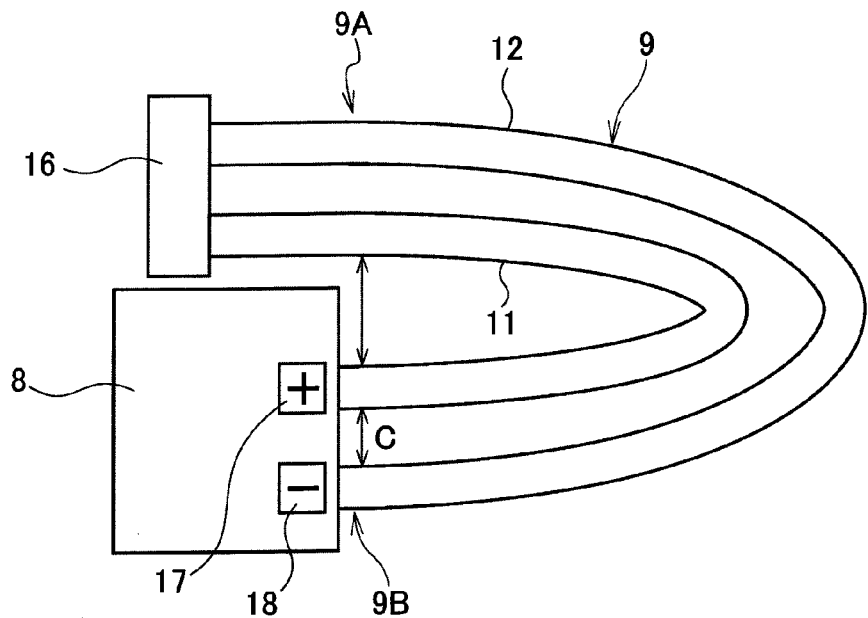
FIG. 5 is an explanatory diagram showing how a positive-side (+) cable is placed on an inner side of a negative (−) cable when the high-voltage cables are routed.
Figure 6:
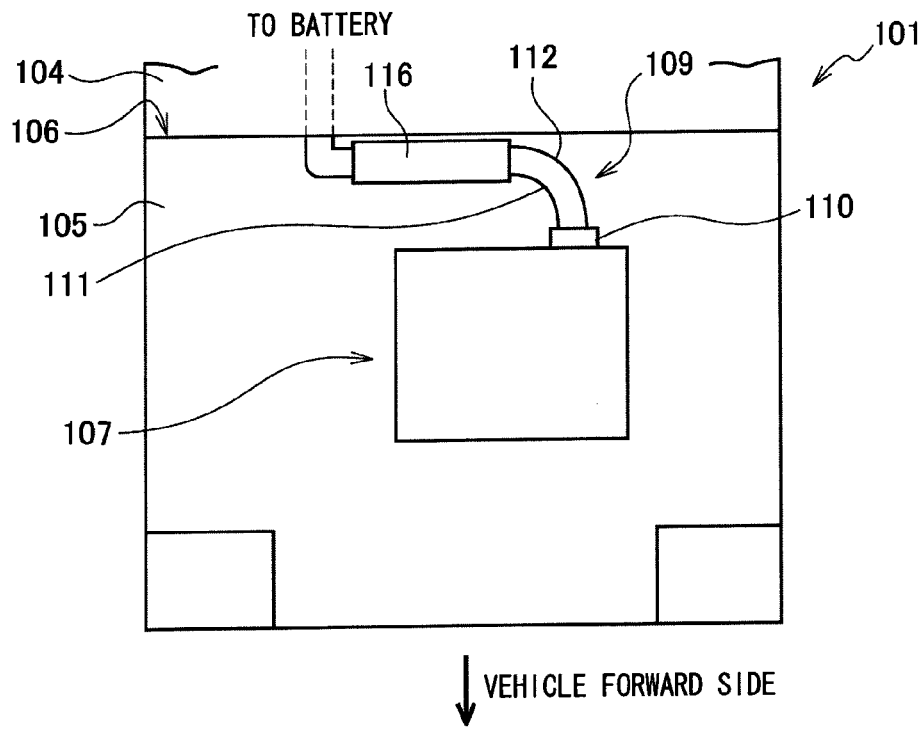
FIG. 6 is a schematic plan view of a front part of a vehicle according to a conventional example.
Figure 7:
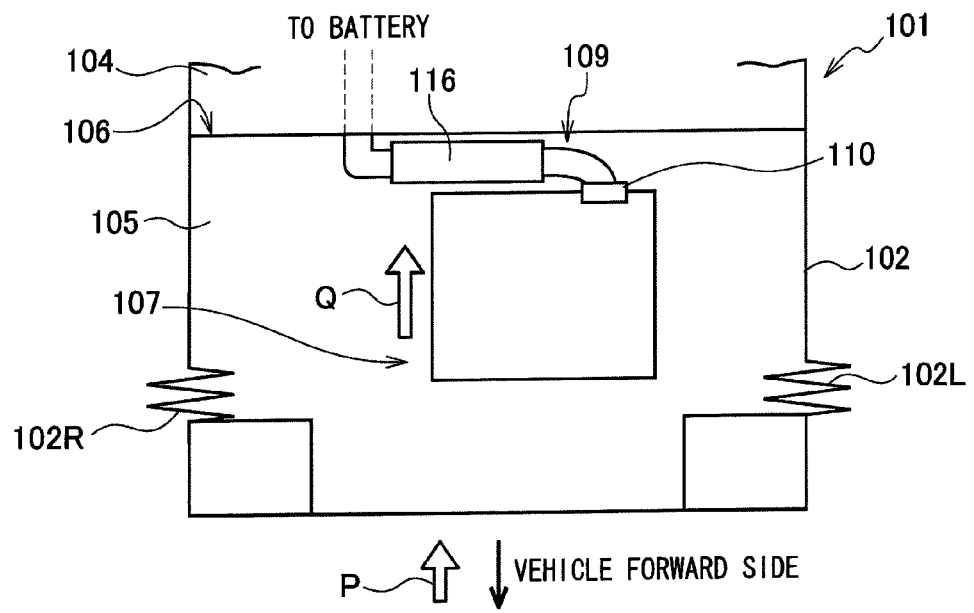
FIG. 7 is a plan view of the front part of the vehicle when an external force acts on the vehicle from a forward side thereof in FIG. 6.
Figure 8:
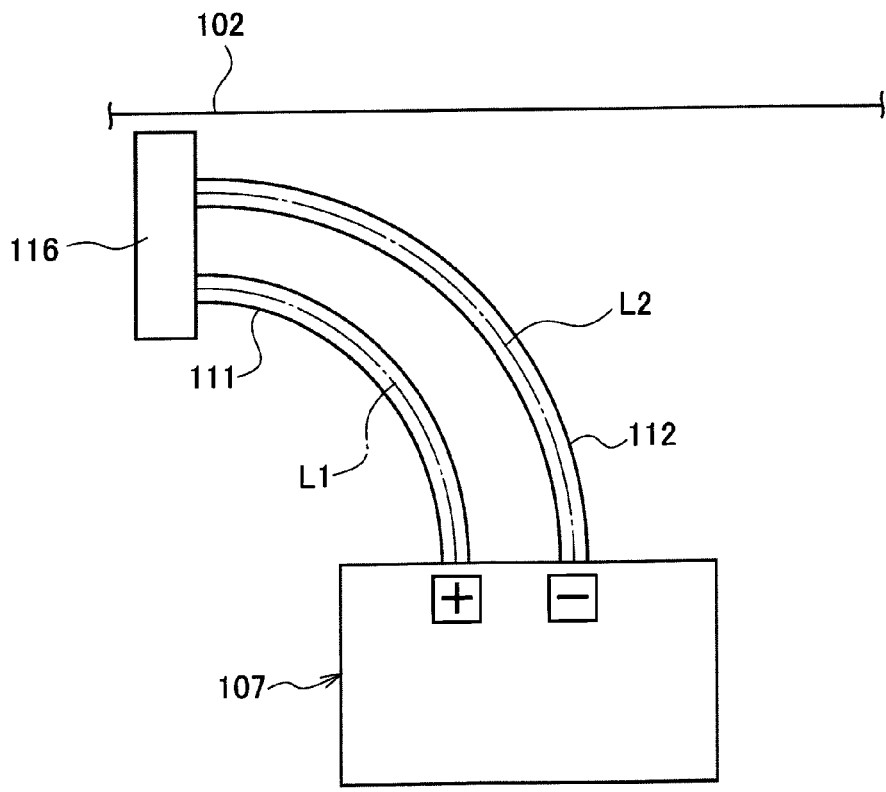
FIG. 8 is an explanatory diagram showing a curved state of high-voltage cables of the high-voltage unit shown in FIG. 6.
Figure 9:
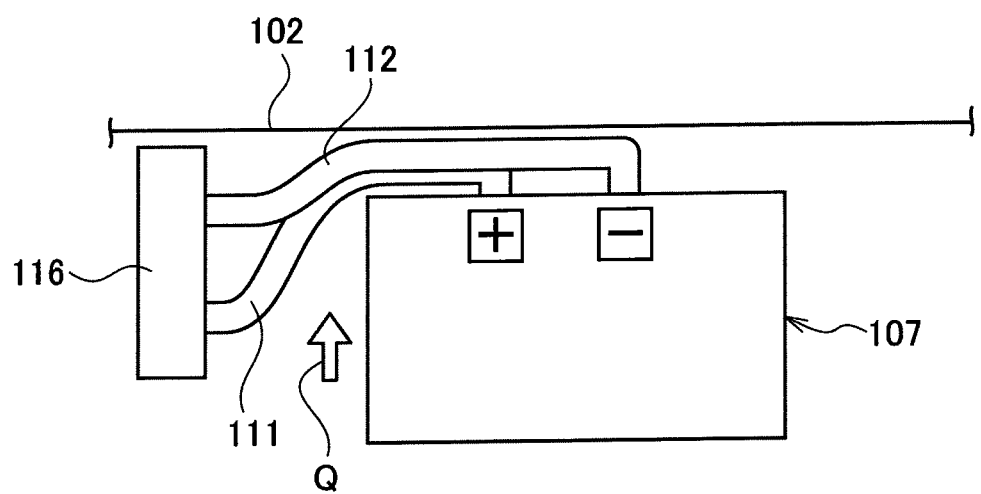
FIG. 9 is an explanatory diagram showing condition in which the high-voltage cables are contacted to each other.

Still furthermore, as shown in FIGS. 4 and 5, since the inverter 8 and high-voltage cables 9 is firmly mounted at their mounting portion, a fixed distance C can be maintained between a positive (+) terminal 17 and a negative (−) terminal 18. In an arrangement in which the high-voltage cables 9 are routed in a U-shaped pattern, portions highly likely to first come into contact are set to be a base of the positive (+) terminal 17 and the positive-side (+) cable 11.

In this way, since the high-voltage cables 9 are connected to a side face of the inverter 8, when an external force acts from the front side (indicated by hollow arrow P in FIG. 2) in a forward/backward direction (running direction) of the vehicle, even if the contracting portions 2R and 2L are produced in the vehicle body 2, it is possible to prevent the connecting portion 10 for the high-voltage cables 9 from contacting the vehicle body 2.

In addition, as mentioned above, the U-shape routing of the high-voltage cables 9 causes the positive-side (+) cable 11 to be placed on the inner side of the U-shape, and accordingly, when an external force acts from the forward side of the vehicle (indicated by hollow arrow P in FIG. 2), even if the contracting portions 2R and 2L are produced in the vehicle body 2, different segments of the positive-side (+) cable 11, which are of the same polarity, will be contacted to each other. Thus, it makes possible to prevent a short circuit between the positive-side (+) cable 11 and the negative-side (−) cable 12 of the high-voltage cables 9.

In the above arrangement, if the negative-side (−) cable 12 is routed on the inner side of the positive-side (+) cable 11 by changing places between the positive-side (+) cable 11 and the negative-side (−) cable 12, different segments of the negative-side (−) cable 12 may be contacted to each other.

Furthermore, the present embodiment, in which the high-voltage unit 7 is described as being the inverter 8, is most effective when the high-voltage unit 7 is the inverter 8. Further, the present embodiment may be most effectively applied to the high-voltage units of vehicles such as electric vehicles or hybrid vehicles.

INDUSTRIAL APPLICABILITY

The routing structure of the high-voltage cables according to the present invention is also applicable to cables connected to other pieces of equipment such as a 12V battery.

REFERENCE NUMERALS

1 - - - vehicle
2 - - - vehicle body
3R - - - right side light
3L - - - left side light
4 - - - cabin
5 - - - storage compartment
6 - - - dash panel
7 - - - high-voltage unit
8 - - - invertor
9 - - - high-voltage cable
10 - - - connecting portion
11 - - - positive (+) side cable
12 - - - minus (−) side cable
13 - - - storage compartment side wall surface
14 - - - vehicle body left side surface
15 - - - space
16 - - - protecting member
17 - - - positive (+) side terminal
18 - - - minus (−) side terminal

The invention claimed is:

1. A protective structure for a high-voltage unit in a vehicle equipped with the high-voltage unit, the vehicle being provided with a cabin, a storage compartment to store the high-voltage unit located in front of the cabin in a longitudinal direction of the vehicle, a dash panel to partition the cabin and the storage compartment, and a high-voltage cable connected to the high-voltage unit,
wherein the high-voltage cable is routed from a rear part on a side of the cabin in the longitudinal direction of the vehicle toward a side surface of the vehicle along a wall surface of the dash panel on a side of the storage compartment, deformed into a U-shape in a space between the dash panel and the high-voltage unit on the way to the high-voltage unit, connected to a side surface of the high-voltage unit, and shaped such that a part of the high-voltage cable which is routed along the wall surface of the dash panel on the side of the storage compartment and a part connected to the high-voltage unit are substantially parallel to each other.

2. The protective structure for a high-voltage unit according to claim 1, wherein the high-voltage unit is an inverter.

3. The protective structure for a high-voltage unit according to claim 1, wherein the high-voltage unit is mounted on an electric vehicle or a hybrid vehicle.

* * * * *